(12) United States Patent
Lesmeister et al.

(10) Patent No.: US 10,272,877 B2
(45) Date of Patent: Apr. 30, 2019

(54) HEATABLE LUMINAIRE COVER

(71) Applicant: SAINT-GOBAIN GLASS FRANCE, Courbevoie (FR)

(72) Inventors: Lothar Lesmeister, Landgraaf (NL); Andreas Schlarb, Wuppertal (DE); Sebastian Schmidt, Stuttgart (DE); Marcus Guldan, Uhingen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/795,178

(22) Filed: Oct. 26, 2017

(65) Prior Publication Data

US 2018/0043862 A1 Feb. 15, 2018

Related U.S. Application Data

(63) Continuation of application No. 14/361,695, filed as application No. PCT/EP2012/074796 on Dec. 7, 2012, now Pat. No. 9,994,195.

(30) Foreign Application Priority Data

Dec. 20, 2011 (EP) ..................................... 11194447

(51) Int. Cl.
| | | |
|---|---|---|
| *B60S 1/02* | (2006.01) | |
| *H05B 3/84* | (2006.01) | |
| *B60S 1/60* | (2006.01) | |
| *H01C 17/02* | (2006.01) | |
| *H05B 3/06* | (2006.01) | |
| *F21V 29/90* | (2015.01) | |
| *F21S 41/20* | (2018.01) | |
| *F21S 45/60* | (2018.01) | |
| *F21S 45/10* | (2018.01) | |

(52) U.S. Cl.
CPC .................. *B60S 1/026* (2013.01); *B60S 1/60* (2013.01); *F21S 41/28* (2018.01); *F21S 45/60* (2018.01); *F21V 29/90* (2015.01); *H01C 17/02* (2013.01); *H05B 3/06* (2013.01); *H05B 3/84* (2013.01); *F21S 45/10* (2018.01); *H05B 2203/004* (2013.01); *H05B 2203/011* (2013.01); *H05B 2203/014* (2013.01); *Y10T 29/49083* (2015.01)

(58) Field of Classification Search
CPC .. F21V 29/90; B60S 1/026; B60S 1/60; F21S 41/28; F21S 45/60; F21S 45/10; H01C 17/02; H05B 3/06; H05B 3/84; H05B 2203/004; H05B 2203/011; H05B 2203/014
See application file for complete search history.

(56) References Cited

U.S. PATENT DOCUMENTS

| | | | |
|---|---|---|---|
| 7,410,267 B2* | 8/2008 | Mochizuki | ............. B29C 70/82 219/202 |
| 9,994,195 B2 | 6/2018 | Lesmeister et al. | |
| 2011/0134655 A1* | 6/2011 | Ohtani | ..................... H05B 3/84 362/546 |
| 2014/0332518 A1 | 11/2014 | Lesmeister et al. | |

* cited by examiner

*Primary Examiner* — Shawntina T Fuqua
(74) *Attorney, Agent, or Firm* — Steinfl + Bruno LLP

(57) ABSTRACT

A method for producing a heatable luminaire cover is described. The heatable luminaire cover has: a polymeric main body, a first busbar, a second busbar and at least two conductor tracks on the inside of the polymeric main body.

3 Claims, 3 Drawing Sheets

HEATABLE LUMINAIRE COVER

CROSS REFERENCE TO RELATED APPLICATIONS

Figure 1:
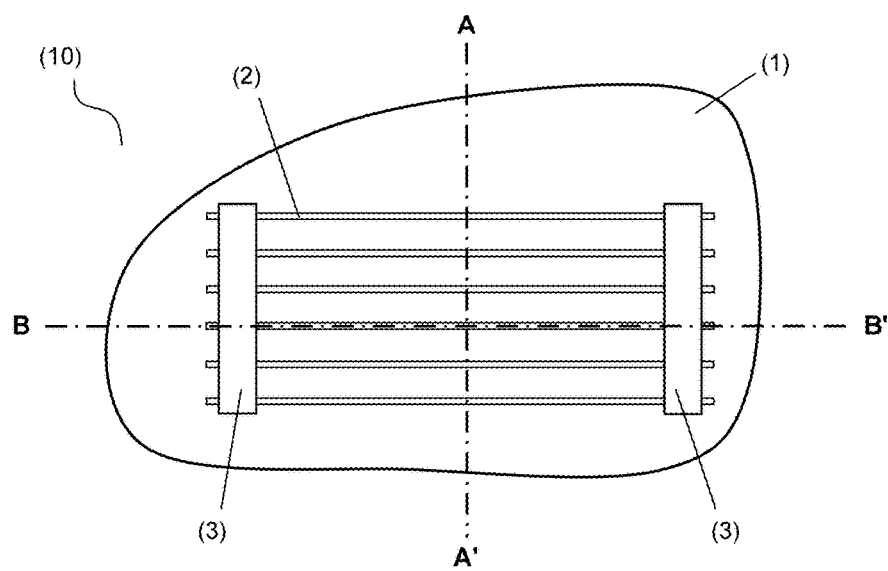

The present application is a continuation application of U.S. patent application Ser. No. 14/361,695 filed on May 29, 2014, which is the US national stage of International Patent Application PCT/EP2012/074796 filed on Dec. 7, 2012 which, in turn, claims priority to European Patent Application EP 11194447.6 filed on Dec. 20, 2011, all of which is incorporated in their entirety by reference.

The invention relates to a heatable luminaire cover, a method for its production, and its use.

The effectiveness of motor vehicle lighting can be impaired at low ambient temperatures, in particular in the winter. Snow, ice, or condensed atmospheric moisture can accumulate on the outer side of the cover of the motor vehicle luminaire. Atmospheric moisture can also condense and freeze on the inner side of the luminaire cover. This lessens the transparency of the luminaire cover and reduces the functionality of the lighting. Road safety is disadvantageously affected.

Motor vehicle headlights were formerly equipped primarily with halogen lamps or xenon lamps. These lamps develop significant heat during operation. The heat is transferred to the luminaire cover and results in defrosting and/or drying of the luminaire cover. Nowadays, motor vehicle headlights are increasingly equipped with light emitting diodes (LED), which generate significantly less heat during operation. Consequently, active heating of the luminaire cover is necessary for the removal of moisture and ice.

US 2006/0232972 A1 discloses a method for producing a cover for a motor vehicle lamp. A heating wire and two electrical connection elements are applied on a flat plastic plate. Each end of the heating wire is welded to an electrical connection element. Then, the luminaire cover made of the plastic plate is shaped by thermoforming. There is a risk of damaging the heating wire or making a connection between the heating wire and an electrical connection element. Moreover, the thermoforming method restricts the design freedom with regard to the shape of the luminaire cover. The electrical contacting is also error prone: If the electrically conductive connection between the two connection elements is interrupted, for example, by a break in the heating wire, the heating function fails completely.

One object of the present invention is to provide a heatable luminaire cover with improved electrical contacting of the heating structures. Another object of the invention is to provide a method for producing a heatable luminaire cover wherein damaging of the heating structures is avoided.

The object of the present invention is accomplished according to the invention by a heatable luminaire cover in accordance with the independent claim 1. Preferred embodiments emerge from the dependent claims.

The heatable luminaire cover according to the invention comprises at least the following characteristics:
a polymeric main body,
a first busbar, a second busbar, and at least two conductor tracks on the inner side of the polymeric main body, wherein each conductor track is electrically connected to the first busbar and to the second busbar.

The term "inner side" refers to the surface of the polymeric main body that is intended to be turned toward the light source after the connection of the heatable luminaire cover to the other elements of the lamp. The term "outer side" is, accordingly, the surface of the polymeric main body that is intended to be turned away from the light source after the connection of the heatable luminaire cover to the other elements of the lamp.

Upon application of an electrical potential difference between the first and second busbar, current flows through each of the conductor tracks. By this means, the conductor tracks, which thus enable active heating of the luminaire cover, are heated.

By means of the first and the second busbar, a stable electrical contacting of the conductor tracks is advantageously provided. Each conductor track is electrically connected to the first and the second busbar and is supplied with voltage independently of the other conductor tracks. The damaging of one conductor track thus does not result in a complete failure of the active heating of the luminaire cover. This is a major advantage of the present invention.

The object of the present invention is further accomplished according to the invention by a method for producing a heatable luminaire cover, wherein at least:
a) one polymeric main body is provided,
b) at least two conductor tracks are fixed on the inner side of the polymeric main body by ultrasonic embedding, and
c) each conductor track is electrically connected to a first busbar and a second busbar.

The polymeric main body has the typically curved three-dimensional shape provided for the luminaire cover. The polymeric main body does not have to be further reshaped before connection to the remaining elements of the lamp. Processing steps that are not associated with changing the curvature of the polymeric main body, for example, drilling, milling, or cutting in the edge region, are, however, possible within the context of the invention.

The polymeric main body of the luminaire cover is provided according to the invention before the conductor tracks are applied. Consequently, the conductor tracks are not stressed during the shaping of the polymeric main body. The particular advantage resides in the avoidance of damage to the conductor tracks and/or to the electrical contacting of the conductor tracks. Moreover, by means of the first and the second busbar, a stable electrical contacting of each individual conductor track is provided.

The polymeric main body can be produced by all suitable methods of plastic processing known to the person skilled in the art, for example, by thermoforming. In a preferred embodiment of the invention, the polymeric main body is produced by injection molding. Compared to thermoforming, injection molding enables the production of a larger number of possible shapes of the polymeric main body. Moreover, the polymeric main body can be produced virtually waste free since subsequent trimming of the workpiece is unnecessary. Complex surface structures can be introduced directly into the cover.

The polymeric main body preferably contains at least polyethylene (PE), polycarbonates (PC), polypropylene (PP), polystyrene, polybutadiene, polynitriles, polyesters, polyurethanes, polymethyl methacrylates, polyacrylates, polyesters, polyamides, polyethylene terephthalate, acrylonitrile butadiene styrene (ABS), styrene acrylonitrile (SAN), acrylonitrile styrene acrylester (ASA), acrylonitrile butadiene styrene—polycarbonate (ABS/PC), and/or copolymers or mixtures thereof.

The polymeric main body particularly preferably contains polycarbonates (PC) and/or polymethyl methacrylate (PMMA). This is particularly advantageous with regard to the transparency, the processing, the strength, the weather resistance, and the chemical resistance of the polymeric main body.

The polymeric main body preferably has a thickness from 2 mm to 5 mm. This is particularly advantageous with regard to the strength and processing of the polymeric main body. The size of the polymeric main body can vary widely and is determined by the use according to the invention.

According to the invention, the polymeric main body is transparent at least in regions. The polymeric main body can be colorless, colored, or tinted. The polymeric main body can be clear or cloudy.

The conductor tracks preferably run rectilinearly between the first and the second busbar. The conductor tracks can, however, also run, for example, wavelike, meanderingly, or in the form of a zigzag pattern between the first and second busbar. The distance between two adjacent conductor tracks is preferably constant over the entire length of the conductor tracks. However, the distance between two adjacent conductor tracks can also change in the path between the first and second busbar.

The conductor tracks can run in any desired direction, preferably horizontally or vertically.

The conductor tracks are applied according to the invention on the polymeric main body by means of ultrasonic embedding. A sonotrode is preferably guided over the inner side of the polymeric main body by a multi-axis robot by means of a robot program adapted to the three-dimensional geometry of the polymeric main body. The sonotrode transmits high-frequency mechanical oscillations (ultrasound) generated by an ultrasonic generator to the polymeric main body. Heat is generated and a surface layer of the inner side of the polymeric main body is melted. The conductor tracks are introduced into the melted surface layer. For this, the sonotrode guides a heating wire on its tip, with the heating wire continuously supplied from a spool of wire near the sonotrode. A tool suitable as a sonotrode is known, for example, from U.S. Pat. No. 6,023,837 A.

The penetration depth of the conductor tracks into the polymeric main body is preferably from 50% to 90%, particularly preferably from 60% to 75% of the thickness of the conductor tracks. The uncomplicated application of the conductor tracks using ultrasound embedding is particularly advantageous with regard to a stable connection between conductor tracks and a polymeric main body.

The distance between two adjacent conductor tracks is preferably from 1 mm to 25 mm, particularly preferably 3 mm to 15 mm. This is particularly advantageous with regard to the transparency of the luminaire cover and the distribution of the heating power introduced via the conductor tracks. The length of the conductor tracks can vary widely and thus be readily adapted to the requirements in the individual case. The conductor tracks have, for example, lengths from 5 cm to 50 cm.

The conductor tracks contain at least one metal, preferably tungsten, copper, nickel, manganese, aluminum, silver, chromium, and/or iron, as well as mixtures and/or alloys thereof. The conductor tracks contain particularly preferably tungsten and/or copper. A particularly good heating effect is thus achieved. The thickness of the conductor tracks is preferably from 15 µm to 200 µm, particularly preferably from 25 µm to 90 µm. This is particularly advantageous with regard to the transparency of the luminaire cover, the heating power introduced, and the avoidance of short circuits.

It has been demonstrated that particularly good results are obtained with conductor tracks that contain tungsten and have a thickness of preferably 15 µm to 100 µm, particularly preferably from 25 µm to 50 µm. Particularly good results are also achieved with conductor tracks that contain copper and have a thickness of preferably 25 µm to 200 µm, particularly preferably 60 µm to 90 µm.

Adjacent conductor tracks can be connected to each other on the side of the first busbar facing away from the second busbar or on the side of the second busbar facing away from the first busbar. The conductor tracks can thus be applied in the form of a single heating wire on the polymeric main body, with the heating wire, after application, comprising two or more sections that are provided as conductor tracks and are connected to each other loop-wise. Each section of the heating wire provided as a conductor track is connected in the region of one end to the first busbar and in the region of the other end to the second busbar.

Each section of the heating wire in the region of the busbars and between the busbars forms a conductor track.

Alternatively, it is possible for adjacent conductor tracks to not be connected to each other on the side of the first busbar facing away from the second busbar and on the side of the second busbar facing away from the first busbar. The conductor tracks are thus applied on the polymeric main body in the form of a plurality of heating wires, with each heating wire connected in the region of one end to the first busbar and in the region of the other end to the second busbar. Each heating wire comprises a conductor track in the region of the busbars and between the busbars.

At least one section of each conductor track is embedded into the polymeric main body. The conductor tracks can be embedded into the polymeric main body along their entire length. This is particularly advantageous with regard to a stable connection between the polymeric main body and the conductor tracks. The electrical contacting with the first and the second busbar then takes place on the side of the conductor tracks facing away from the polymeric main body.

In an advantageous embodiment of the invention, the regions on the ends of the conductor tracks provided for electrical contacting with the busbars are not embedded into the polymeric main body and can be lifted off it. The particular advantage resides in the possibility of a simple and stable electrical contacting with the busbars. The busbars are preferably arranged on the polymeric main body and fixed thereon, for example, with an adhesive or a double-sided adhesive tape. The region on the end of each conductor track not embedded into the polymeric main body is guided over the first busbar on the side of the first busbar facing away from the polymeric main body and connected to the first busbar. The region on the other end of each conductor track not embedded into the polymeric main body is guided over the second busbar on the side of the second busbar facing away from the polymeric main body and connected to the second busbar.

In a particularly preferred embodiment, a first lower busbar and a second lower busbar are arranged on the polymeric main body. The region on the end of each conductor track not embedded into the polymeric main body is arranged between the first lower busbar and a first upper busbar and is connected to the first lower and the first upper busbar. The region on the other end of each conductor track not embedded into the polymeric main body is arranged between the second lower busbar and a second upper busbar and is connected to the second lower and the second upper busbar. The particular advantage resides in an effective and very stable electrical contacting of the conductor tracks. For the heating of the luminaire cover, a first electrical potential is applied to the first lower busbar and the first upper busbar. A second electrical potential is applied to the second lower busbar and the second upper busbar.

The electrical connection between the conductor tracks and the busbars is preferably done by means of an electrically conductive adhesive, by soldering, or by welding.

The busbars preferably contain tungsten, copper, nickel, manganese, aluminum, silver, chromium, and/or iron, as well as mixtures and/or alloys thereof, particularly preferably tungsten and/or copper. The busbars preferably have a thickness from 10 µm to 200 µm, particularly preferably from 50 µm to 100 µm. The width of a busbar, along which the busbar is connected to the conductor tracks, is preferably from 2 mm to 100 mm, particularly preferably from 5 mm to 20 mm. The length of the busbars can vary widely and thus be ideally adapted to the requirements of the individual case. The minimum length of the busbars results from the number of conductor tracks and the distance between the adjacent conductor tracks. The length of the busbars is, for example, from 5 cm to 20 cm. The busbars are connected to an external power supply such that an electric potential difference between the first and the second busbar can be applied.

For aesthetic reasons, it can be desirable for the electrical contacting of the conductor tracks by means of the busbars to not be visible from the outside. To that end, for example, the polymeric main body can be colored or blackened in the region of the busbars. The polymeric main body can, for example, be produced by multicomponent injection molding, with the polymeric main body comprising, in the regions on which the busbars are to be arranged, an opaque component which obscures the view of the electrical contacting through the polymeric main body.

The opaque component of the polymeric main body preferably contains at least polyethylene (PE), polycarbonates (PC), polypropylene (PP), polystyrene, polybutadiene, polynitriles, polyesters, polyurethanes, polymethyl methacrylates, polyacrylates, polyesters, polyamides, polyethylene terephthalate, acrylonitrile butadiene styrene (ABS), styrene acrylonitrile (SAN), acrylonitrile styrene acrylester (ASA), acrylonitrile butadiene styrene—polycarbonate (ABS/PC), and/or copolymers or mixtures thereof, particularly preferably polycarbonates (PC), polyethylene terephthalate (PET), and/or polymethyl methacrylate (PMMA).

The opaque component of the polymeric main body preferably contains at least one colorant. The opacity of the component is achieved by means of the colorant. The colorant can contain inorganic and/or organic dyes and/or pigments. The colorant can be colored or uncolored. Suitable colorants are known to the person skilled in the art and can, for example, be looked up in the *Colour Index of the British Society of Dyers and Colourists* and the *American Association of Textile Chemists and Colorists*. Preferably, a black pigment is used as the colorant, for example, carbon black, aniline black, bone black, iron oxide black, spinel black, and/or graphite. Thus, a black opaque component is obtained.

The opaque component may contain other inorganic or organic fillers, particularly preferably $SiO_2$, $Al_2O_3$, $TiO_2$, clay minerals, silicates, zeolites, glass fibers, carbon fibers, glass beads, organic fibers, and/or mixtures thereof. The fillers can further increase the stability of the opaque component. Moreover, the fillers can lessen the amount of polymeric materials and thus reduce the production costs of the component.

Alternatively, a colored or blackened element can be arranged between the busbar and the polymeric main body. Alternatively, masking screen prints can be applied on a surface of the polymeric main body.

In an advantageous embodiment of the invention, a protective coating is applied on the outer side of the polymeric main body to protect the luminaire cover according to the invention against environmental influences. Preferably used are thermally hardening or UV-hardening coating systems based on polysiloxanes, polyacrylates, polymethacrylates, and/or polyurethanes. The protective coating preferably has a layer thickness from 1 µm to 50 µm, particularly preferably from 2 µm to 25 µm. The particular advantage resides in the increased scratch resistance and weather resistance of the polymeric main body due to the protective coating.

In addition to coloring compounds and pigments, the protective coating can also contain UV-blockers and preservatives as well as components to increase scratch resistance, for example, nanoparticles.

The protective coating can, for example, be applied to the outer side of the polymeric main body by a dipping, flooding, or spraying method. After application, the protective coating is hardened preferably by temperature and/or UV light input. In the case of production of the polymeric main body by injection molding, the protective coating can also be applied to the outer side of the polymeric main body by an in-mold coating method.

Products suitable as a protective coating are, for example, AS4000, AS4700, PHC587, or UVHC300, provided by the company Momentive.

The protective coating can also comprise a plurality of layers, preferably an adhesion-promoting layer on the polymeric main body and a lacquer coating on the adhesion-promoting layer. The adhesion-promoting layer can contain, for example, acrylates and have a layer thickness from 0.4 µm to 5 µm. The lacquer coating can contain, for example, polysiloxanes and have a layer thickness from 1 µm to 15 µm. The adhesion-promoting layer is preferably dried after application, before the lacquer coating is applied.

The protective coating can be applied before or after the application of the conductor tracks and busbars. The protective coating can be applied before or after the connection of the conductor tracks to the busbars.

The heatable luminaire cover is preferably used as a cover for lights of means of transportation for travel on land, in the air, or on water, in particular for headlights, taillights, side-marker lights, and/or position lights of passenger cars, trucks, buses, streetcars, subways, trains, and motorcycles.

Figure 2:
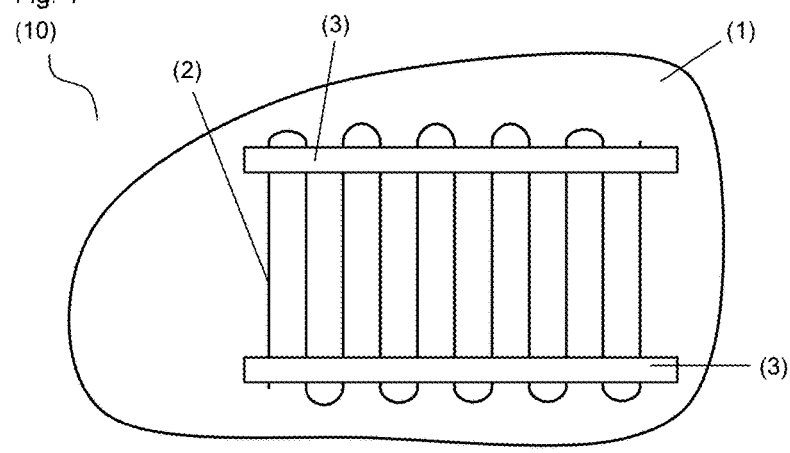
Figure 3:
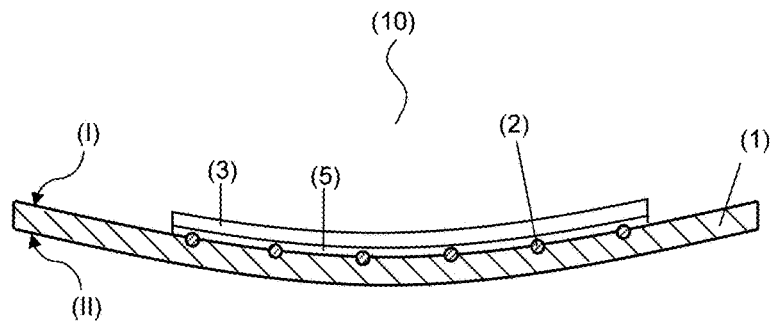
Figure 4:
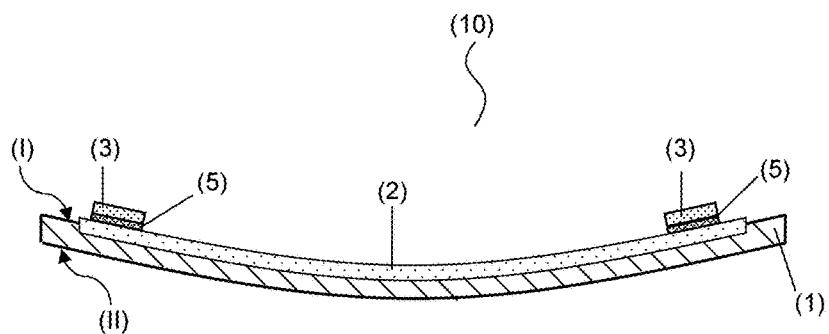
Figure 5:
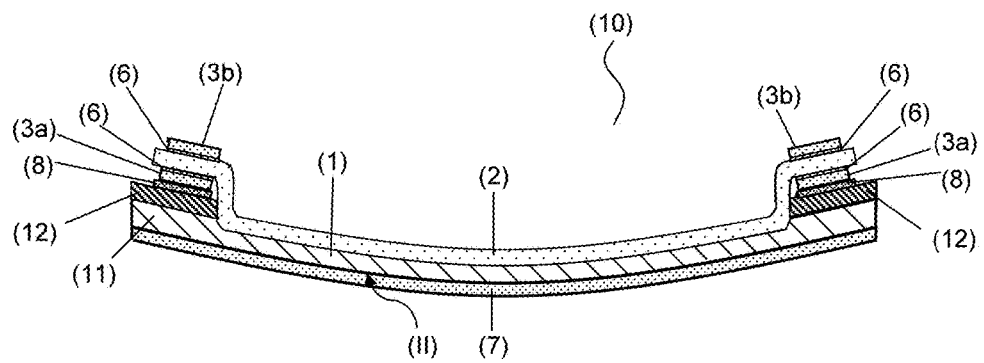
Figure 6:
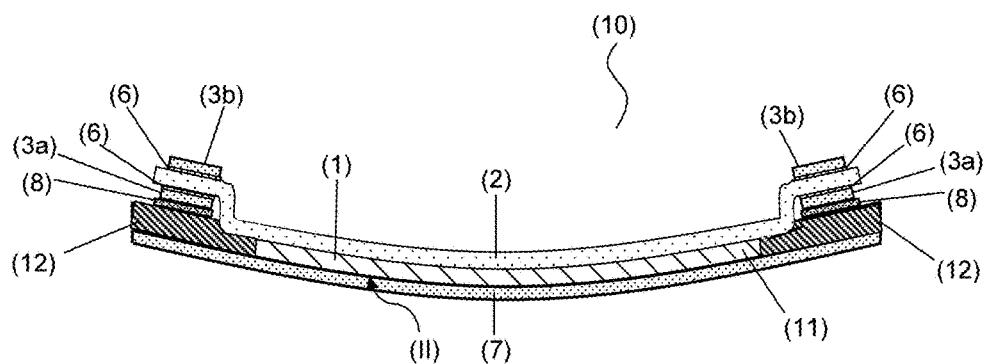
Figure 7:
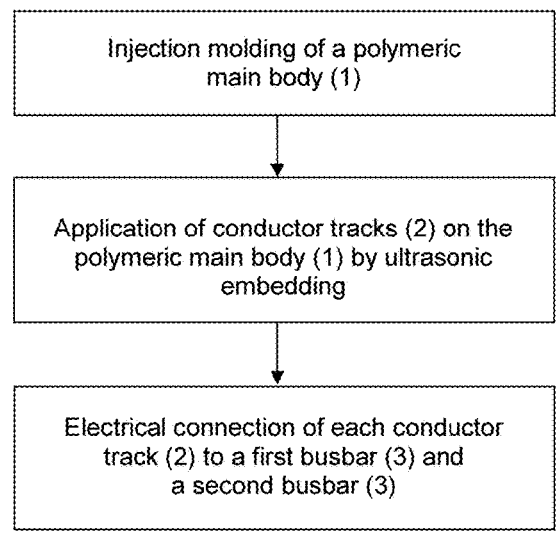

The invention is explained in detail with reference to drawings and exemplary embodiments. The drawings are schematic representations and not true to scale. The drawings in no way restrict the invention. They depict:

FIG. 1 a plan view of the inner side of a first embodiment of the heatable luminaire cover according to the invention, FIG. 2 a plan view of the inner side of another embodiment of the heatable luminaire cover according to the invention, FIG. 3 a section along A-A' through the heatable luminaire cover of FIG. 1, FIG. 4 a section along B-B' through the heatable luminaire cover of FIG. 1, FIG. 5 a section along B-B' through another embodiment of the heatable luminaire cover according to the invention, FIG. 6 a section along B-B' through another embodiment of the heatable luminaire cover according to the invention, and FIG. 7 a detailed flowchart of the method according to the invention for producing a heatable luminaire cover.

FIG. 1, FIG. 3, and FIG. 4 each depict a detail of a luminaire cover 10 according to the invention for a passenger car headlight. The polymeric main body 1 contains polycarbonate (PC) and has a thickness of 4 mm. Six heating wires with a length of 20 cm are arranged as conductor tracks 2 on the inner side (I) of the polymeric main body. The conductor tracks 2 are arranged horizontally and parallel to each other. The conductor tracks 2 contain copper and have a thickness of 70 μm. The distance between two adjacent heating wires is 10 mm. The conductor tracks 2 are embedded into the polymeric main body over their entire length by means of ultrasonic embedding, with the penetration depth being roughly 45 μm.

Each conductor track 2 is electrically connected to two busbars 3. The electrical connection between the conductor tracks 2 and the busbars 3 is made via an electrically conductive adhesive 5. The busbars 3 contain copper and have a thickness of 50 μm, a length of 6 cm, and a width of 1 cm.

The busbars 3 are connected to an external power supply (not shown). Upon application of a potential difference between the first busbar 3 and the second busbar 3, current flows through each conductor track 2. The heat generated enables active heating of the luminaire cover 10. Due to the electrical contacting of the individual conductor tracks 2 independently of each other according to the invention, the damaging of one conductor track 2 advantageously does not result in a complete failure of the heating in the luminaire cover 10.

FIG. 2 depicts a plan view of an alternative embodiment of the luminaire cover 10 according to the invention. Eleven conductor tracks 2 are arranged on the inner side (I) of the polymeric main body 1. The conductor tracks 2 are arranged vertically and parallel to each other. The conductor tracks 2 are sections of a single heating wire that is applied on the polymeric main body 1 in straight sections connected to each other loop-wise. Adjacent conductor tracks 2 are thus connected to each other by a region of the heating wire, with the connection occurring alternatingly on the side of the second busbar 3 facing away from the first busbar 3 and on the side of the first busbar 3 facing away from the second busbar 3.

FIG. 3 depicts a section along A-A' through the heatable luminaire cover 10 according to the invention of FIG. 1. The polymeric main body 1 and conductor tracks 2 embedded therein, running horizontally and in parallel, as well as the busbar 3 situated behind the section line A-A' and the electrically conductive adhesive 5 can be seen.

FIG. 4 depicts a section along B-B' through the heatable luminaire cover 10 according to the invention of FIG. 1. Busbars 3, which run vertically and are glued with an electrically conductive adhesive 5 onto the polymeric main body 1 and the conductor tracks 2, are depicted.

FIG. 5 depicts a section along B-B' through an alternative embodiment of the heatable luminaire cover 10 according to the invention. In the two regions of the electrical contacting, the conductor tracks 2 are not embedded into the polymeric main body 1. Each conductor track 2 is arranged in a region between a first lower busbar 3a and a first upper busbar 3b not embedded into the polymeric main body 1. Each conductor track 2 is arranged in the other region between a second lower busbar 3a and a second upper busbar 3b not embedded into the polymeric main body 1. The conductor tracks 2 are connected by means of a soldering compound 6 to the busbars 3a, 3b. The soldering compound 6 contains silver. The first lower busbar 3a and the second lower busbar 3a are fixed on the polymeric main body 1 by means of a double-sided adhesive tape 8.

The polymeric main body 1 is produced by multicomponent injection molding. The polymeric main body 1 contains a transparent component 11 with a thickness of 4 mm. An opaque component 12 with a thickness of 2 mm is applied in regions of the transparent component 11. The transparent component 11 contains polycarbonate (PC). The opaque component 12 contains a mineral-filled polycarbonate (PC)—polyethylene terephthalate (PET) mixture. The starting material for the injection molding of the opaque component 12 was prepared by the company Teijin Chemicals Ltd. (Panlite Y-0346 Color No. TG6654). The busbars 3a are arranged on the opaque component 12. Thus, the view of the electrical contacting of the conductor tracks 2 by means of the busbars through the polymeric main body 1 is advantageously obscured.

A protective coating 7 is applied on the outer side (II) of the polymeric main body 1. The protective coating 7 contains a thermally hardening polysiloxane-based lacquer (Momentive PHC587) and has a layer thickness of 15 μm. By means of the protective coating 7, the polymeric main body 1 is advantageously protected against environmental influences such as weathering and mechanical action.

FIG. 6 depicts a section along B-B' through an alternative embodiment of the heatable luminaire cover 10 according to the invention. In the region of the electrical contacting of the conductor tracks 2, the opaque component 12 extends from the inner side (I) of the polymeric main body 1 to the outer side (II) of the polymeric main body 1. The view of the electrical contacting of the conductor tracks 2 by means of the busbars through the polymeric main body 1 is advantageously obscured.

FIG. 7 depicts a flowchart of an exemplary embodiment of the method according to the invention for producing a heatable luminaire cover (10). In a first step, a polymerer main body 1 is produced in the injection molding process. The polymeric main body 1 contains polycarbonate. The polymeric main body 1 has a thickness of 4 mm and the three-dimensional, curved shape provided for the luminaire cover (10). Then, heating wires are applied by ultrasonic embedding as conductor tracks 2 on the inner side (I) of the polymeric main body 1. The conductor tracks 2 contain copper and have a thickness of 70 μm. The conductor tracks 2 are embedded along their entire length into the polymeric main body 1, with the penetration depth of the conductor tracks 2 into the polymeric main body 1 being roughly 45 μm. Then, a first busbar 3 and a second busbar 3 are connected to each conductor track 2 via an electrically conductive adhesive 5.

In an alternative preferred embodiment, the regions on the ends of the conductor tracks 2 provided for the electrical contacting with the busbars 3 are not embedded into the polymeric main body 1. After the application of the conductor tracks 2, a first lower busbar 3a and a second lower busbar 3a are arranged with a double-sided adhesive tape 8 on the polymeric main body 1. The region on one end of each conductor track 2 not embedded into the polymeric main body 1 is guided over the first lower busbar 3a. The region on the other end of each conductor track 2 not embedded into the polymeric main body 1 is guided over the second lower busbar 3a. Soldering compound 6 is arranged on the first lower busbar 3a and the second lower busbar 3a. Then, a first upper busbar 3b is arranged above the first lower busbar 3a and a second upper busbar 3b is arranged above the second lower busbar 3a. The first lower busbar 3a and the first upper busbar 3b as well as the second lower busbar 3a and the second upper busbar 3b are soldered to the conductor tracks 2 by the input of energy.

In the method according to the invention, the polymeric main body 1 is prepared before the conductor tracks 2 are applied. Thus, in contrast to the prior art, the conductor tracks 2 are not stressed by reshaping steps after the application of the conductor tracks 2. Damaging of the conductor tracks 2, of the busbars 3, or of the connection between a conductor track 2 and a busbar 3 was detected in none of the test specimens prepared.

The conductor tracks 2 according to the invention enabled the removal of condensed atmospheric moisture and ice from the luminaire cover (10) within a short time. Due to the electrical contacting of each conductor track 2 by means of the busbars 3 deviating from the prior art, even intentionally caused damage of a single conductor track 2 did not result in the complete failure of the heating action.

This result was unexpected and surprising for the person skilled in the art.

LIST OF REFERENCE CHARACTERS (1) polymeric main body
(2) conductor track
(3) busbar
(3*a*) lower busbar
(3*b*) upper busbar
(5) electrically conductive adhesive
(6) soldering compound
(7) protective coating
(8) double-sided adhesive tape
(10) heatable luminaire cover
(11) transparent component of 1
(12) opaque component of 1
(I) inner side of the polymeric main body 1
(II) outer side of the polymeric main body 1
A-A' section line
B-B' section line

What is claimed is:

1. A method for producing a heatable luminaire cover, comprising:
    preparing a polymeric main body;
    fixing a plurality of conductor tracks on an inner side of the polymeric main body by ultrasonically embedding at least one section of each conductor track of the plurality of conductor tracks into the surface of the polymeric main body at a depth that is from 50% to 90% of their thickness; and
    electrically connecting each conductor track of the plurality of conductor tracks to a first busbar and a second busbar, independently from other conductor tracks of the plurality of conductor tracks,
        wherein the plurality of conductor tracks is arranged between the first busbar and the polymeric main body and between the second busbar and the polymeric main body.

2. The method according to claim 1, wherein a protective coating is applied on an outer side of the polymeric main body.

3. The method according to claim 1, wherein the polymeric main body is prepared by injection molding or by thermoforming.

* * * * *